United States Patent
Schnell et al.

(10) Patent No.: US 7,526,866 B2
(45) Date of Patent: May 5, 2009

(54) VARIABLE DUST CHUTE FOR CIRCULAR SAWS

(75) Inventors: John W. Schnell, Jackson, TN (US); Mark A. Etter, Humboldt, TN (US); Debbie Harr, Hixson, TN (US); Leslie D. Gist, Hunterville, NC (US)

(73) Assignee: Black & Decker Inc., Newark, DE (US)

( * ) Notice: Subject to any disclaimer, the term of this patent is extended or adjusted under 35 U.S.C. 154(b) by 324 days.

(21) Appl. No.: 10/979,089

(22) Filed: Nov. 1, 2004

(65) Prior Publication Data
US 2009/0007441 A1      Jan. 8, 2009

Related U.S. Application Data

(60) Provisional application No. 60/516,143, filed on Oct. 31, 2003.

(51) Int. Cl.
*B27B 9/00* (2006.01)
*B27G 3/00* (2006.01)

(52) U.S. Cl. .................. 30/124; 30/390; 144/252.1; 451/456; D8/66

(58) Field of Classification Search ............ 30/123, 30/124, 125, 388, 390, 391, 123.3, 319; 451/456, 451/451; 83/98, 100, 478; D8/66; 144/252.1, 144/252.2; 125/13.01; 415/451, 456
See application file for complete search history.

(56) References Cited

U.S. PATENT DOCUMENTS

| | | | | |
|---|---|---|---|---|
| 2,562,396 A | * | 7/1951 | Ewald | 83/478 |
| 3,034,493 A | * | 5/1962 | Bandy | 125/13.01 |
| 3,882,598 A | * | 5/1975 | Earle et al. | 30/390 |
| 5,084,972 A | * | 2/1992 | Waugh | 30/124 |
| 5,327,649 A | * | 7/1994 | Skinner | 30/124 |
| 6,039,037 A | * | 3/2000 | Taomo et al. | 125/13.01 |
| 6,167,626 B1 | * | 1/2001 | Doumani et al. | 30/124 |
| 6,219,922 B1 | * | 4/2001 | Campbell et al. | 30/124 |
| 6,557,261 B1 | * | 5/2003 | Buser et al. | 30/124 |
| 7,207,874 B2 | * | 4/2007 | Bohne et al. | 451/359 |
| 7,328,512 B2 | * | 2/2008 | Martin | 30/124 |

FOREIGN PATENT DOCUMENTS

DE      3843912 A1   *   6/1990
JP      2002332995 A  *  11/2002

OTHER PUBLICATIONS

Makita Cordless Circular Saw with Dust Collection Instruction Manual.
First Test: Bosch 18-Volt Cordless Circular Saw; by Rick Schwolsky; Publication date: May/Jun. 2002.

* cited by examiner

*Primary Examiner*—Hwei-Siu C Payer
(74) *Attorney, Agent, or Firm*—Michael Aronoff; Adan Ayala

(57) ABSTRACT

The present invention is directed to a hand-held circular saw with an integrated dust collection system. Such saw may include an upper blade guard for protecting the user from a saw blade, the upper blade guard configured with a front region and a back region, the front region including a hollow channel to control the pathway of dust and debris and a dust collection system incorporated within the front region of the upper blade guard allowing dust and debris to be directed away from the user.

13 Claims, 5 Drawing Sheets

VARIABLE DUST CHUTE FOR CIRCULAR SAWS

CROSS-REFERENCE TO RELATED APPLICATIONS

The present application claims the benefit under 35 U.S.C. § 119(e) of U.S. Provisional Application Ser. No. 60/516,143, filed Oct. 31, 2003. Said U.S. Provisional Application Ser. No. 60/516,143 is herein incorporated by reference in its entirety.

FIELD OF THE INVENTION

The present invention generally relates to the field of hand-held circular saws, and more particularly to a hand-held circular saw with an integrated dust collection system.

BACKGROUND OF THE INVENTION

Saw dust generated during use of rotary power tools is a major problem. First, such dust may cause user airway irritation or possible explosion if ignited by a flame or a spark. In addition, saw dust is very difficult to clean-up and as such, results in the woodworker spending an inordinate amount of time cleaning up the work area. Further, saw dust generated while making a cut may impair user visibility of a work piece and thus, decreased cut precision. Therefore, saw dust generation needs to be controlled to minimize the aforementioned adverse effects associated with woodworking as well as to improve cutting visibility allowing for a user to make more precise cuts.

Currently, saw dust generation associated with use of rotary power tools may be controlled by use of a respirator or a dust collection system. Use of a respirator prevents a woodworker from being exposed to dust particles and thereby eliminates the possibility of user airway irritation. However, such device does not assist the woodworker in decreasing the amount of time associated with clean-up or visibility of the work piece. In contrast, the dust collection system including a hose-pipe-suction-filter system for catching chips and dust at the source reduces the possibility of user airway irritation and time spent cleaning up as well as to increase visibility of the work piece. Typically, a woodworker may employ a central dust collection system which may be attached to various types of power tools or an individual dust collection system which is a component of a particular tool.

Although dust collection systems presently known in the art have greatly reduced the possibility of user airway irritation and amount of clean-up associated with the use of rotary power tools as well as enhanced user visibility, many limitations are still associated with such systems. A central dust collection system, for instance, is often quite large, expensive to purchase and may require modifications to be made to the work area (i.e. addition of a 220V electrical supply and ductwork) prior to operation. Further, an individual dust collection system which is a component of a particular tool (i.e. a hand-held circular saw) is limited by the need to attach a vacuum hose to the dust port confining user movement of the saw and negating the benefit of a cordless tool.

Therefore, it would be desirable to develop a hand-held circular saw with an integrated dust collection system which includes a variable dust chute allowing dust and debris to be collected in a dust collection bag or circulated through the path of a blade guard of the circular saw preventing saw dust and debris from being blown upward toward the user.

SUMMARY OF THE INVENTION

Accordingly, the present invention is directed to a hand-held circular saw with an integrated dust collection system. As such, the dust collection system allows dust and debris to be collected in a dust collection receptacle, directed away from the user, or circulated through the upper blade guard of the circular saw.

In accordance with a first aspect of the present invention, a hand-held circular saw with an integrated dust collection system is disclosed. In an exemplary embodiment, the hand-held circular saw with an integrated dust collection system is comprised of an upper blade guard for protecting the user from a saw blade, the upper blade guard configured with a front region and a back region, the front region including a hollow channel to control the pathway of dust and debris, and a dust collection system incorporated within the front region of the upper blade guard allowing dust and debris to be directed away from the user.

In accordance with a second aspect of the present invention, a hand-held circular saw with an integrated variable dust collection system is disclosed. As illustrated in an exemplary embodiment, the hand-held circular saw with an integrated variable dust collection system is comprised of an upper blade guard for protecting the user from a saw blade, the upper blade guard configured with a front region and a back region, the front region including a hollow channel to control the pathway of dust and debris and a dust collection system incorporated within the front region of the upper blade guard of the circular saw which includes a dust chute with a pivot mechanism allowing the chute to have a first position and a second position, in the first position dust and debris is directed away from the user while in the second position it is circulated via the pathway of the upper blade guard prior to exiting out of the back region of the guard.

In accordance with a third aspect of the present invention, a hand-held circular saw with an integrated variable dust collection system is disclosed. Such device includes an upper blade guard for protecting the user from a saw blade, the upper blade guard configured with a front region and a back region, the front region including a hollow channel to control the pathway of dust and debris and a dust collection system incorporated within the front region of the upper blade guard of the circular saw wherein the dust collection system is comprised of a variable dust exhaust port with a cap that includes a rotational mechanism allowing dust and debris to be directed away from the user.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
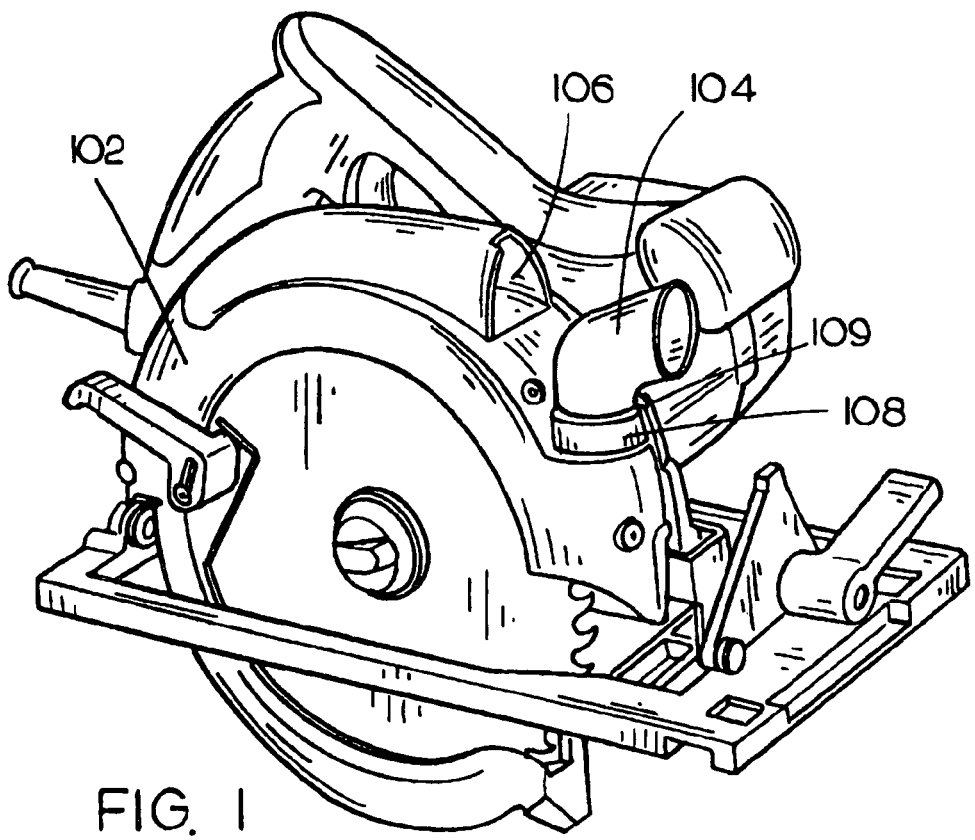
FIG. 1 is an isometric view illustrating a hand-held circular saw with an integrated variable dust collection system in accordance with an exemplary embodiment of the present invention whereby the dust chute is in the first position in which the dust and debris is directed away from the user.

FIG. 1 illustrates a hand-held circular saw with an integrated dust collection system in accordance with an exemplary embodiment of the present invention. Such saw includes an upper blade guard 102 for protecting the user from a saw blade and a dust collection system including a dust chute 104 to allow dust and debris to be directed away from the user. In the embodiment illustrated, upper blade guard 102 has a front region and a back region. Further, the dust chute 104 is disposed within the front region of the upper blade guard, includes a pivot mechanism 108 and is substantially conformed to the contour of the upper blade guard.

In the present embodiment, the dust chute 104 is in the first position in which the dust and debris may be either directed away from the user or collected. The dust chute 104 is locked into the first position by a mechanical stop 109. In use, for example, a user directs the dust chute 104 away from oneself allowing dust and debris to be carried away from the work piece and cutting visibility increased. In an additional embodiment, a dust collection receptacle is attached to the dust chute allowing dust to be collected and contained. Such receptacle may include a small bag or a hose connected to a central vacuum system. It should be understood that the shape and composition of the dust chute as well as the receptacle attached to such chute may be varied in accordance with one of skill in the art without departing from the scope and spirit of the present invention.

Figure 2:
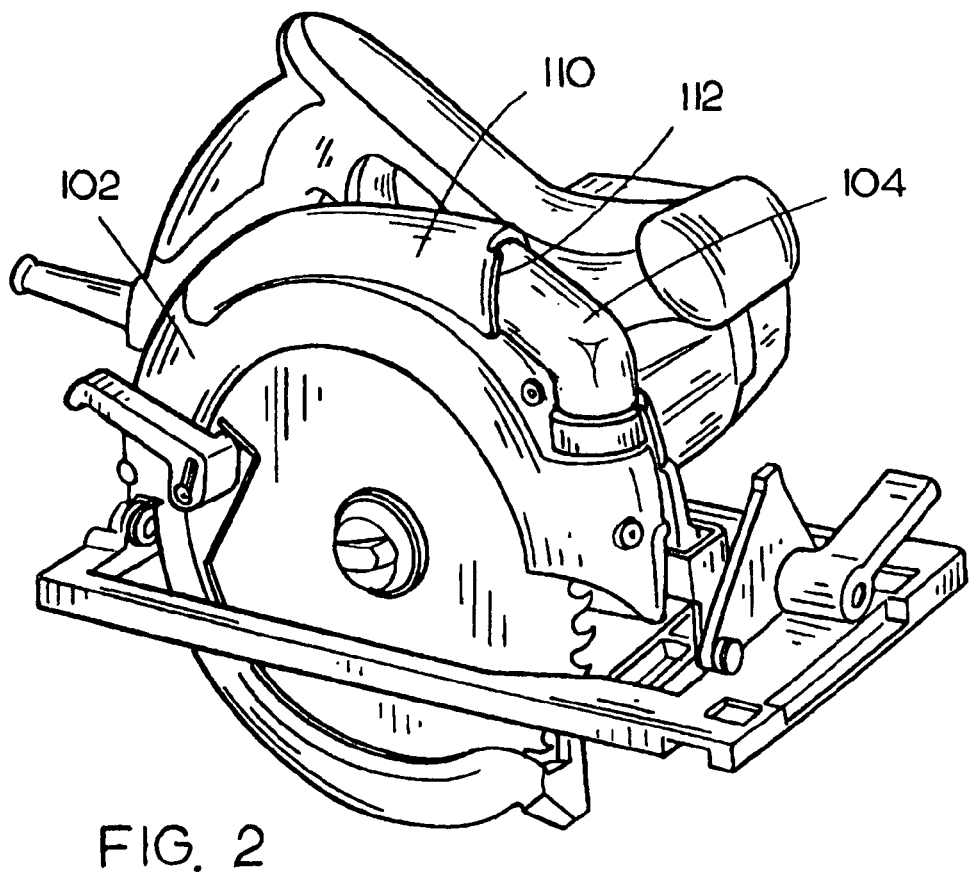
FIG. 2 is an isometric view illustrating a hand-held circular saw with an integrated variable dust collection system in accordance with an exemplary embodiment of the present invention whereby the dust chute is in the second position in which the dust and debris is redirected through the upper blade guard.

FIG. 2 depicts the hand-held circular saw with an integrated dust collection system as shown in FIG. 1, however the dust chute 104 is in the second position instead of the first position whereby dust and debris is redirected through a hollow channel 110 disposed within the front region of the upper blade guard 102. In use, the dust chute 104 is aligned with the hollow channel 110 and dust circulates through the front of the upper blade guard 102 via the hollow channel 110 and then exits out of the back of such guard. The dust chute is secured into place and thereby aligned with the hollow channel 110 by a partial lip 112 located on the hollow channel. It is contemplated that additional means may be employed to secure the position of the dust chute including a mechanical securing device, a friction lock, or the like without departing from the present invention.

Figure 3A:
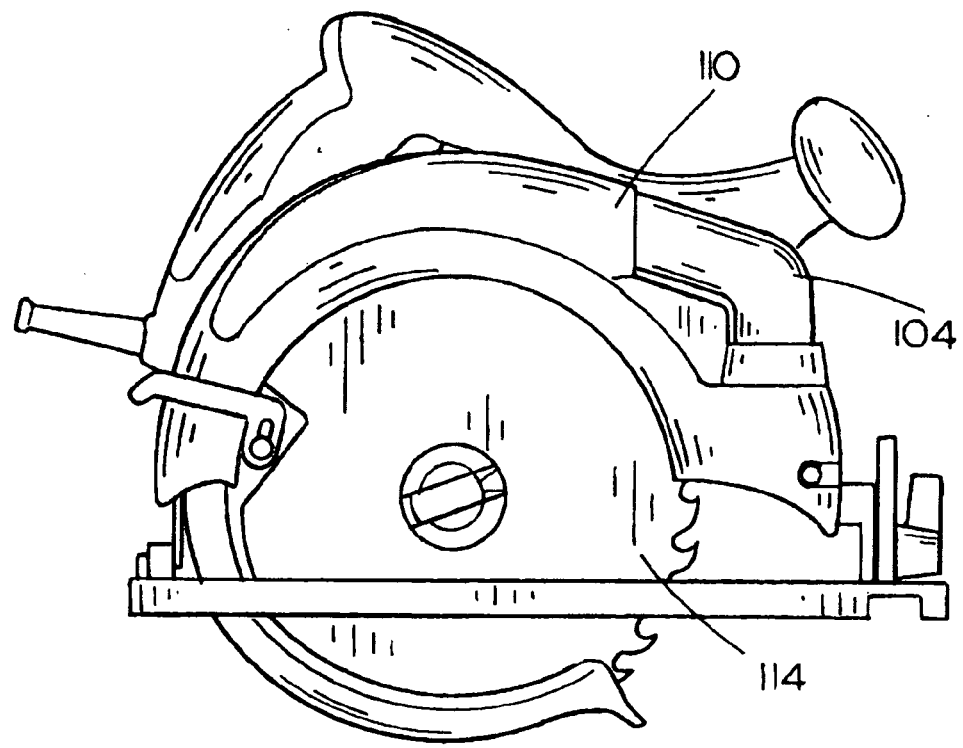
FIG. 3A is a side view of a hand-held circular saw with an integrated variable dust collection system in accordance with an exemplary embodiment of the present invention whereby the dust chute is in the second position.
Figure 3B:
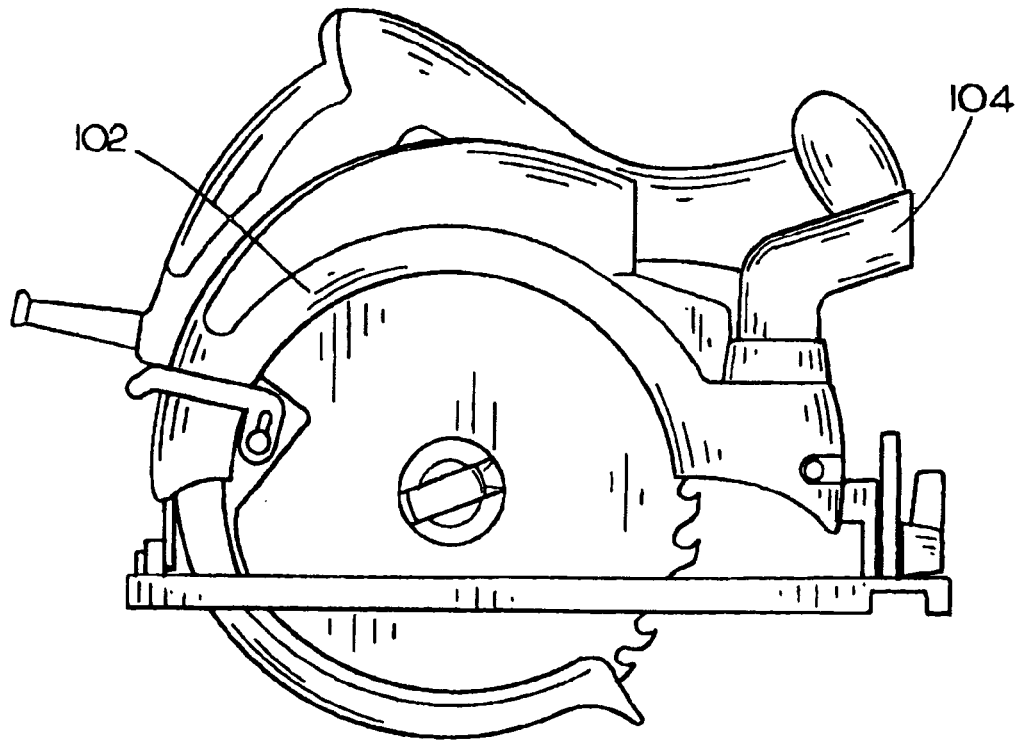
FIG. 3B is a side view of a hand-held circular saw with an integrated variable dust collection system in accordance with an exemplary embodiment of the present invention whereby the dust chute is in the first position.

FIGS. 3A and 3B illustrate the hand-held circular saw with an integrated dust collection system in accordance with the exemplary embodiment of the present invention as depicted in FIGS. 1 and 2. In FIG. 3A, the dust collection assembly is in the second position whereby dust chute 104 is aligned with hollow channel 110. In use, dust and debris is circulated through the hollow channel of the upper blade guard prior to exiting the rear of such guard. FIG. 3B demonstrates the dust collection assembly disposed in the upper blade guard 102 in the first position whereby dust chute 104 may be connected to a dust receptacle (not shown) or directed so that dust and debris blow away from the work piece and user.

Figure 4A:
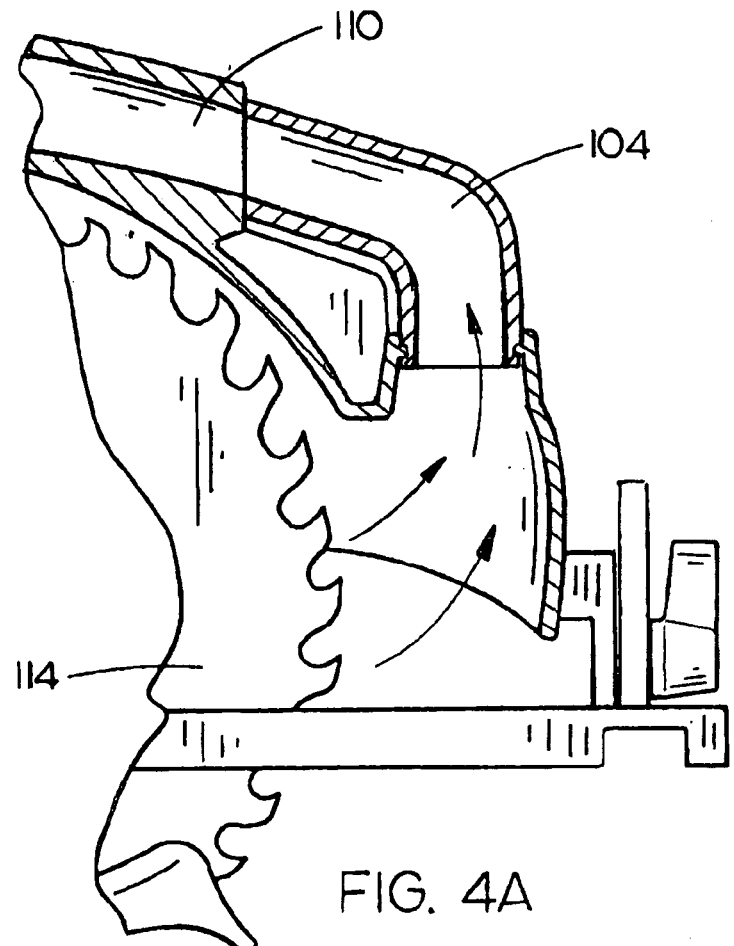
FIG. 4A is a cross-sectional view of an integrated variable dust collection system in accordance with an exemplary embodiment of the present invention illustrating the pathway in which dust and debris is circulated with the dust chute secured in the second position.
Figure 4B:
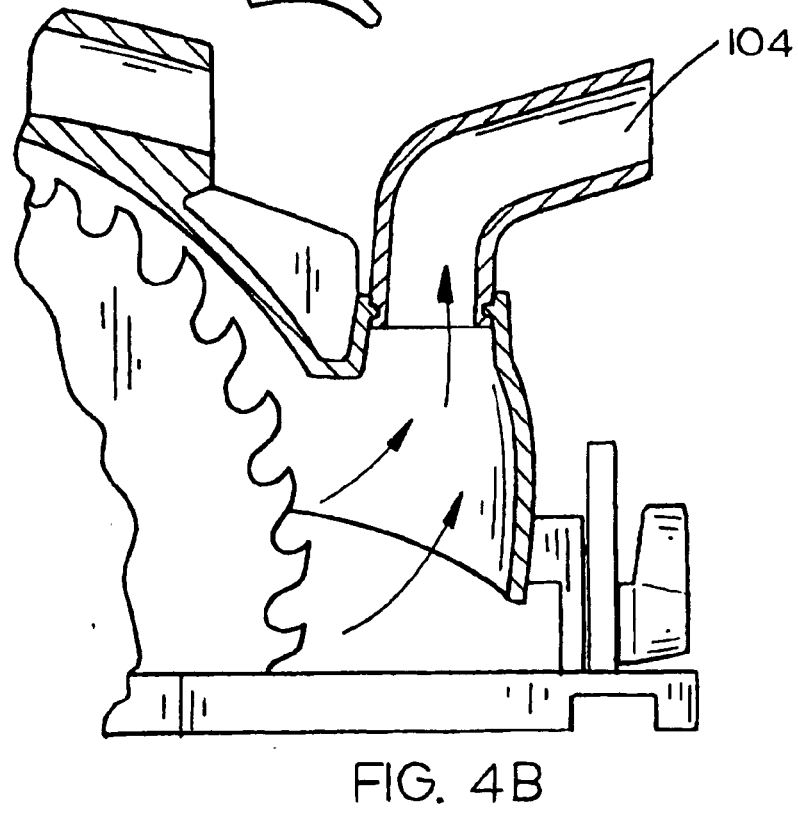
FIG. 4B is a cross-sectional view of the upper blade guard and dust collection system as illustrated in FIG. 4A except the dust chute is in the first position.

Referring now to FIGS. 4A and 4B, the pathway in which dust and debris is circulated with the dust chute secured in the second position or the first position, respectively, is illustrated. As illustrated in FIG. 4A, dust chute 104 is aligned with hollow channel 110 and thus, secured in the second position. With the dust chute 104 in the second position, dust and debris generated during saw use is circulated along the same rotational pathway of saw blade 114. With the rotation of saw blade 114, dust and debris are circulated through dust chute 104 into hollow channel 110 along the inner compartment of the upper blade guard 102 prior to exiting the rear of such guard allowing the particles to be blown away from the user and the work piece. In FIG. 4B, the dust chute 104 is in the first position whereby the dust and debris is blown away from the work piece out the front of the upper blade guard or collected and contained in a receptacle (not shown).

Figure 5B:
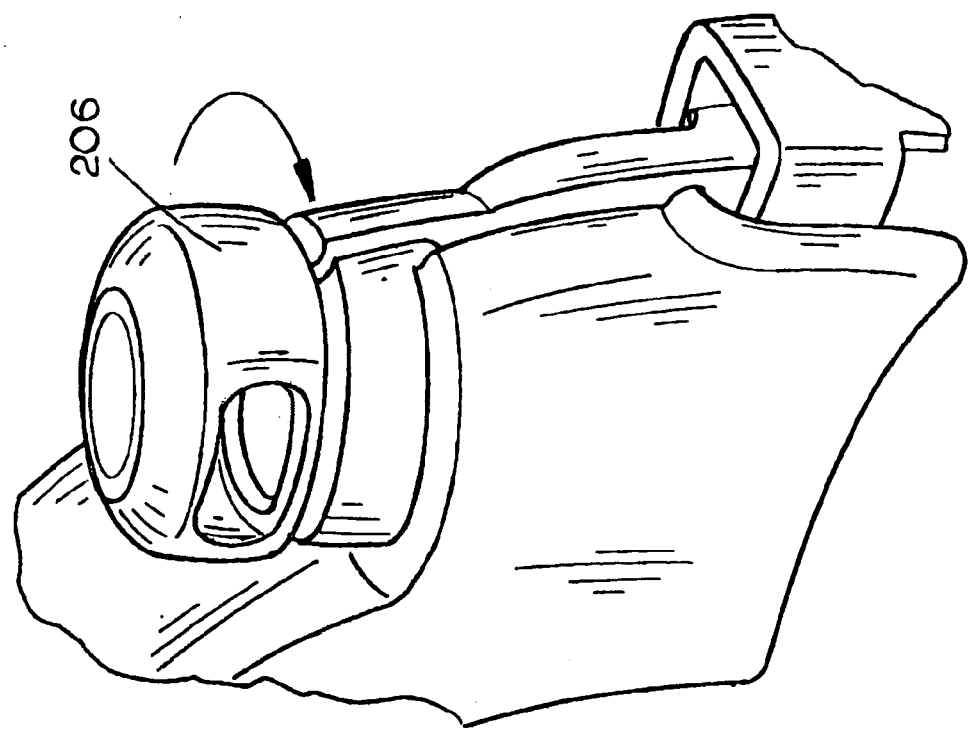
FIG. 5B is an exploded view of the variable dust exhaust port including a cap with a rotational mechanism as illustrated in FIG. 5A whereby the rotational feature of such cap is demonstrated.
Figure 5A:
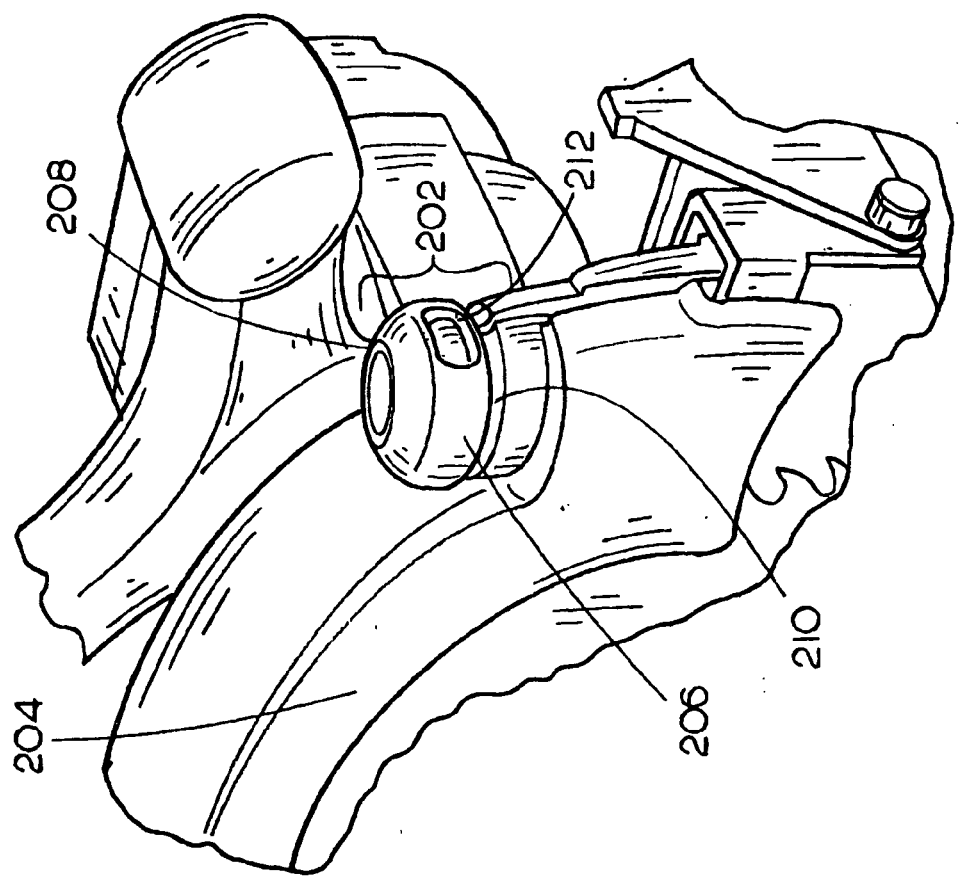
FIG. 5A is a partial isometric view illustrating a hand-held circular saw with an integrated variable dust collection system in accordance with an additional exemplary embodiment of the present invention in which the dust collection system is comprised of a variable dust exhaust port including a cap with a rotational mechanism.
Figure 6:
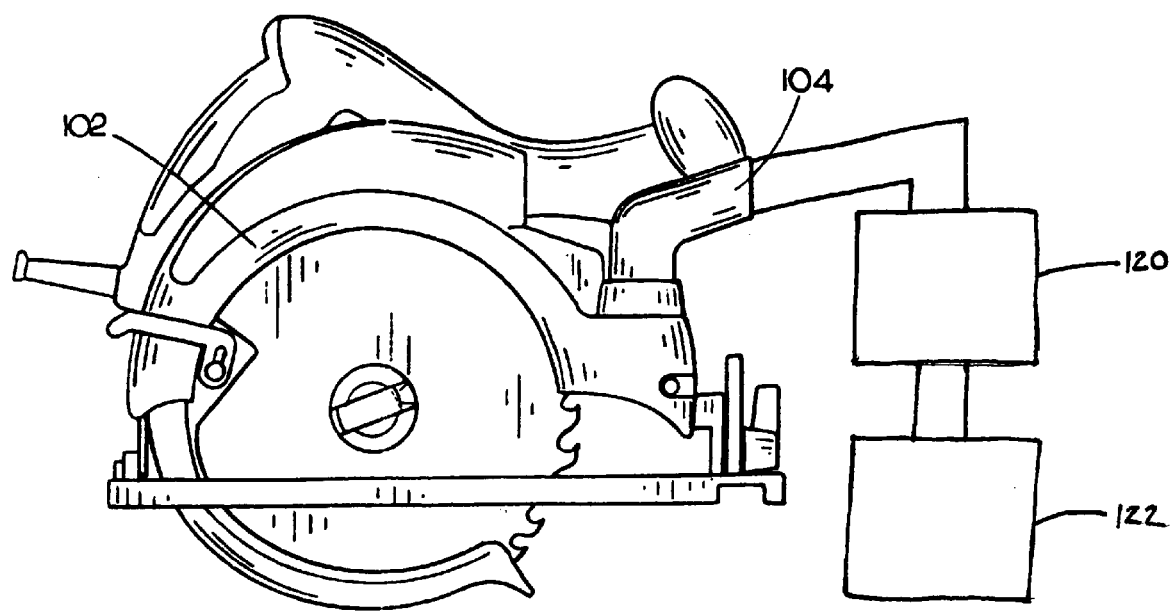
FIG. 6 is a side view of a hand-held circular saw with an integrated variable dust collection system in accordance with an exemplary embodiment of the present invention whereby the dust chute is in the first position and connected to a dust collection receptacle and/or central vacuum.

FIGS. 5A and 5B illustrate a hand-held circular saw with an integrated variable dust collection system in accordance with an additional exemplary embodiment of the present invention. As depicted by FIG. 5A, the dust collection system includes a variable dust exhaust port 202 incorporated within the front region of the upper blade guard 204 of the circular saw. Such port includes a cap 206 with a rotational mechanism that allows dust and debris to be directed away from the user. In an exemplary embodiment, the cap includes a lift ring 208 on the top of said cap to allow the dust port 202 to be closed off. Further, a groove 210 is incorporated within the port for receiving a dust collection bag, a hose from a vacuum system, or the like, allowing dust and debris from the circular saw to be collected and contained. In use, for example, the lift ring 208 is opened and a dust collection bag is secured around groove 210 and dust and debris generated during the operation of the circular saw are collected and contained within said bag. In addition, an opening 212 in cap 206 allows dust and debris to be directed away from the work piece when such cap is rotated into the open position.

FIG. 5B illustrates the rotational cap of the variable dust exhaust port shown in FIG. 5A in the closed position. As such, the dust and debris from the circular saw circulates through the upper blade guard (see FIGS. 1, 2, 3 and 4) prior to exiting out of the back of such guard.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A hand-held circular saw with an integrated dust collection system comprising:
   an upper blade guard for protecting a user from a saw blade, the upper blade guard configured with a front region and a back region, the front region including a hollow channel to control the pathway of dust and debris;
   a dust collection system, having a first end and a second end, located within the front region of the upper blade guard allowing dust and debris to be directed away from the user, the first end of the dust collection system connects to the front region of the upper blade guard; and
   a lip on the hollow channel allowing the second end of the dust collection system to be aligned with the hollow channel disposed within the front region of the upper blade guard,
   wherein the dust collection system includes a variable dust chute, the dust chute being rotatable about an axis parallel to a plane of the saw blade thereby allowing the dust chute to rotate between a first position and a second position, and
   wherein, in the first position the dust chute directs dust and debris away from the user and in the second position the dust chute directs dust and debris to the hollow channel.

2. The hand-held circular saw with an integrated dust collection system of claim 1, wherein the dust chute is disposed within the front region of the upper blade guard of the circular saw.

3. The hand-held circular saw with an integrated dust collection system of claim 1, wherein the variable dust chute is substantially conformed to the contour of the upper blade guard.

4. The hand-held circular saw with an integrated dust collection system of claim 1, further comprising a friction lock on the dust collection system allowing the system to be aligned with the front region of the upper blade guard.

5. The hand-held circular saw with an integrated dust collection system of claim 1, further comprising a dust collection receptacle attached to the dust collection system to collect dust and debris from the circular saw.

6. The hand-held circular saw with an integrated dust collection system of claim 5, wherein the dust collection receptacle includes a bag or a hose attached to a central vacuum system.

7. A hand-held circular saw with an integrated variable dust collection system comprising:
   an upper blade guard for protecting a user from a saw blade, the upper blade guard configured with a front region and a back region, the front region including a hollow channel to control the pathway of dust and debris; and
   a dust collection system incorporated within the front region of the upper blade guard of the circular saw and including a dust chute,
   wherein the dust chute includes a rotatable mechanism allowing the chute to rotate about an axis parallel to the saw blade between a first position and a second position, in the first position the dust chute directs dust and debris away from the user and in the second position the dust chute directs dust and debris to the hollow channel.

8. The hand-held circular saw with an integrated variable dust collection system of claim 7, wherein the dust chute is substantially conformed to the contour of the upper blade guard.

9. The hand-held circular saw with an integrated variable dust collection system of claim 7, further comprising a partial lip on the hollow channel allowing the dust collection system to be aligned with the hollow channel disposed within the front region of the upper blade guard and securing the dust chute into the second position.

10. The hand-held circular saw with an integrated variable dust collection system of claim 7, further comprising a friction lock on the dust chute allowing the chute to be aligned with the front region of the upper blade guard.

11. The hand-held circular saw with an integrated variable dust collection system of claim 7, wherein a dust collection receptacle can be connected to the dust chute when the dust chute is in the first position.

12. The hand-held circular saw with an integrated variable dust collection system of claim 11, wherein the dust collection receptacle includes a container for collecting the dust and debris from the circular saw.

13. The hand-held circular saw with an integrated variable dust collection system of claim 11, wherein the dust collection receptacle includes a hose connected to a central vacuum system.

* * * * *